United States Patent
Alon et al.

(10) Patent No.: US 9,430,782 B2
(45) Date of Patent: Aug. 30, 2016

(54) BIDDING ON SEARCH RESULTS FOR TARGETING USERS IN AN ONLINE SYSTEM

(71) Applicant: Facebook, Inc., Menlo Park, CA (US)

(72) Inventors: Amit Alon, Los Altos, CA (US); Gregory Joseph Badros, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 357 days.

(21) Appl. No.: 13/717,549

(22) Filed: Dec. 17, 2012

(65) Prior Publication Data
US 2014/0172565 A1 Jun. 19, 2014

(51) Int. Cl.
G06Q 30/02 (2012.01)
G06Q 50/00 (2012.01)

(52) U.S. Cl.
CPC ...... G06Q 30/0275 (2013.01); G06Q 30/0251 (2013.01); G06Q 50/01 (2013.01)

(58) Field of Classification Search
USPC ...................................................... 705/14.54
See application file for complete search history.

(56) References Cited

U.S. PATENT DOCUMENTS

| | | | | |
|---|---|---|---|---|
| 8,768,922 B2* | 7/2014 | Crane | ............... | G06F 17/30864 705/14.73 |
| 2006/0242017 A1* | 10/2006 | Libes | ................ | G06F 17/30864 705/14.54 |
| 2010/0306249 A1* | 12/2010 | Hill et al. | ...................... | 707/769 |
| 2011/0022621 A1* | 1/2011 | Luo et al. | ...................... | 707/769 |
| 2011/0112916 A1* | 5/2011 | Baluja | .................... | G06Q 30/02 705/14.73 |
| 2011/0113349 A1* | 5/2011 | Kiciman et al. | .............. | 715/753 |
| 2011/0191171 A1* | 8/2011 | Dasdan | ........................ | 705/14.49 |
| 2011/0191364 A1* | 8/2011 | LeBeau et al. | ............... | 707/767 |
| 2012/0047135 A1* | 2/2012 | Hansson | ............. | G06F 17/3064 707/731 |
| 2012/0131032 A1* | 5/2012 | Rakshit | ........................ | 707/767 |
| 2012/0136847 A1* | 5/2012 | Venkataraman | .. | G06F 17/30657 707/706 |
| 2012/0226564 A1* | 9/2012 | Mirrokni Banadaki et al. | ........................... | 705/14.66 |
| 2013/0173398 A1* | 7/2013 | Wang | .................. | G06Q 30/0256 705/14.73 |
| 2013/0226912 A1* | 8/2013 | Agapiev | ........................ | 707/723 |

FOREIGN PATENT DOCUMENTS

WO WO 2010099632 A1 * 9/2010 ............. G06Q 30/00

OTHER PUBLICATIONS

Type less find more—fast autocompletion search with a succinct index—Bast et al—2006.*

* cited by examiner

Primary Examiner — Namrata (Pinky) Boveja
Assistant Examiner — Gautam Ubale
(74) Attorney, Agent, or Firm — Fenwick & West LLP

(57) ABSTRACT

Advertisements in a social networking system may be targeted to searching users in relation with a real-time search engine operated by a social networking system. Ads are targeted to users based in part on social information included in a structured search query and/or search results on a page. In a typeahead search, a user of the social networking system may receive prefix search results of objects in the search box. The prefix search results are ranked by relevance to the user, and advertisers may bid for particular objects to increase their ranking in the results list. An option may be provided to a viewer of search query results to buy an ad that would be seen by other users who performed the same search query, received a targeted search result, or based on targeting criteria as determined by the viewer bidding on the ad.

26 Claims, 8 Drawing Sheets

BIDDING ON SEARCH RESULTS FOR TARGETING USERS IN AN ONLINE SYSTEM

BACKGROUND

The present invention relates generally to online systems and more particularly to bidding on search results for targeting users in an online system.

Traditional advertisers used focus groups and demographic data to gain an understanding of how to design and implement effective ad campaigns. For example, a sports drink advertiser may use a random sampling of a target population, such as 18-35 year-old men, to determine whether an ad would be effective. However, this approach to advertising targeting may lead to inefficient ad spending because advertisements may be presented to viewers that are not interested in sports or exercise, for example.

In recent years, online systems, particularly social networking systems, have made it easier for users to share their interests and preferences in real-world concepts, such as their favorite movies, musicians, celebrities, soft drinks, hobbies, sports teams, and activities. These interests may be declared by users in user profiles and may also be inferred by social networking systems. Users can also interact with these real-world concepts through multiple communication channels on social networking systems, including interacting with pages on the social networking system, sharing interesting articles about causes and issues with other users on the social networking system, and commenting on actions generated by other users on objects external to the social networking system. Actions performed on objects by users on external websites, such as playing gaming applications, listening to music-streaming services, and reading document sharing systems, may also be captured by the social networking system. Users of the social networking system frequently search for various phrases in the social networking system, such as their favorite celebrities, restaurants to dine at, and karaoke bars. In real time, a search engine on the social networking system may return search results, such as content item posts, users, entities, pages, groups, events, and applications in the social networking system, that are relevant to the search queries. Tools have not been developed to enable advertisers to target user searches in a social networking system.

Specifically, information available on social networking systems about users' interactions with a real time search engine on the social networking system has not been made available to advertisers as targeting criteria. Because users may perform thousands of searches on objects within and external to the social networking system on a daily basis, enabling advertisers to target these interactions provides a valuable opportunity for advertisers that seek to drive traffic and increase engagement with their websites and brands. However, existing systems have not provided efficient mechanisms of enabling advertisers to target users based on user searches.

SUMMARY

Advertisements in a social networking system may be targeted to searching users in relation with a real-time search engine operated by a social networking system. Ads are targeted to users based in part on social information included in a structured search query and/or search results on a page where the search results are objects in the social networking system. In a typeahead search, a user of the social networking system may receive prefix search results of objects in the search box. The prefix search results are ranked by relevance to the user, and advertisers may bid for particular objects to increase their ranking in the results list. The social networking system may also provide an option to a viewer of search query results in the social networking system to buy an ad that would be seen by other users who performed the same search query, received a targeted search result, or based on targeting criteria as determined by the viewer bidding on the ad.

Figure 1:
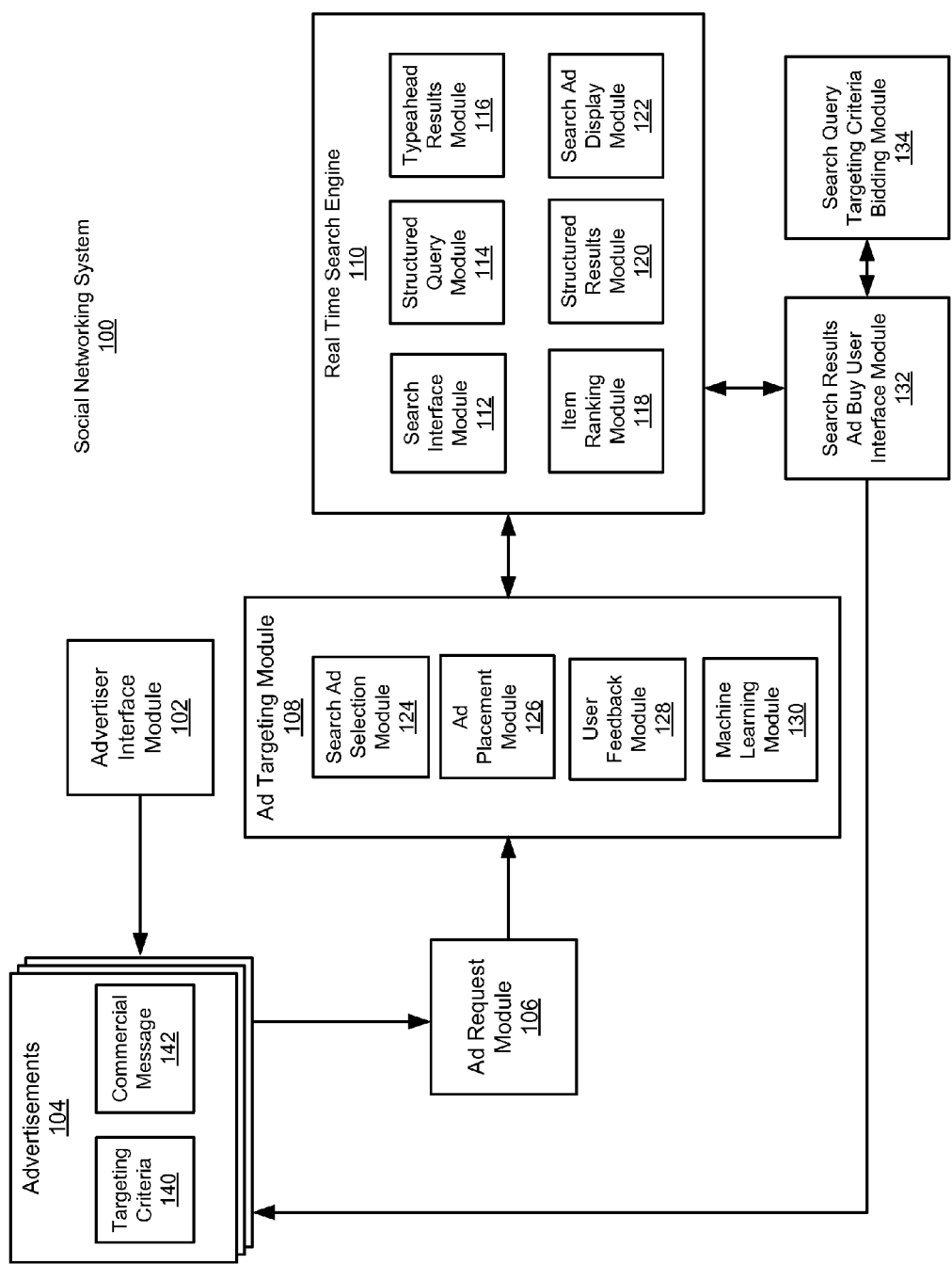
FIG. 1 is a high-level block diagram illustrating a process of targeting advertisements in relation with a real-time search engine on a social networking system according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user. A social networking system may also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social networking system based on shared interests.

A social graph includes nodes connected by edges that are stored on a social networking system. Nodes include users and objects of the social networking system, such as web pages embodying concepts and entities, and edges connect the nodes. Edges represent a particular interaction between two nodes, such as when a user expresses an interest in a news article shared by another user about "America's Cup." The social graph may record interactions between users of the social networking system as well as interactions between users and objects of the social networking system by storing information in the nodes and edges that represent these interactions. Custom graph object types and graph action types may be defined by third-party developers as well as administrators of the social networking system to define attributes of the graph objects and graph actions. For example, a graph object for a movie may have several defined object properties, such as a title, actors, directors, producers, year, and the like. A graph action type, such as "purchase," may be used by a third-party developer on a website external to the social networking system to report custom actions performed by users of the social networking system. In this way, the social graph may be "open," enabling third-party developers to create and use the custom graph objects and actions on external websites.

Third-party developers may enable users of the social networking system to express interest in web pages hosted on websites external to the social networking system. These web pages may be represented as page objects in the social networking system as a result of embedding a widget, a social plug-in, programmable logic or code snippet into the web pages, such as an iFrame. Any concept that can be embodied in a web page may become a node in the social graph on the social networking system in this manner. As a result, users may interact with many objects external to the social networking system that are relevant to a keyword or keyword phrase, such as "Justin Bieber." Each of the interactions with an object may be recorded by the social networking system as an edge. By enabling advertisers to target their advertisements based on user interactions with objects related to a keyword, the advertisements may reach a more receptive audience because the users have already performed an action that is related to the advertisement. For example, a merchandiser that sells Justin Bieber t-shirts, hats, and accessories may target ads for new merchandise to users that have recently performed one of multiple different types of actions, such as listening to Justin Bieber's song "Baby," purchasing Justin Bieber's new fragrance, "Someday," commenting on a fan page for Justin Bieber, and attending an event on a social networking system for the launch of a new Justin Bieber concert tour. Enabling third-party developers to define custom object types and custom action types is described further in "Structured Objects and Actions on a Social Networking System," U.S. application Ser. No. 13/239,340 filed on Sep. 21, 2011, which is hereby incorporated by reference.

A social networking system may enable advertisers to target their advertisements in relation to a real-time search engine in different ways. A sophisticated advertiser may create and target advertisements to type-ahead search results and executed search results using an application programming interface (API) that exposes the information gathered by the social networking system about searches generated by users. In one embodiment, an advertiser may create an advertisement that includes within the content of the advertisement information about a query made by a searching user that caused the ad to be targeted to that user using the API. For example, an advertisement for beer may include within the advertisement references to query terms about food, bars, or karaoke. The advertisement may be placed within the search results included on a search result page, in one embodiment. In another embodiment, an advertiser may request a target object be boosted, or increased, in a ranking of search results for type-ahead search results as the querying user generates the search terms. In a further embodiment, a search ad buy user interface, or user interface element, may be presented as an advertisement within the search results to enable an advertiser to bid on a search query, search terms, and/or search results for use as targeting criteria in an advertisement. An option may be provided to a viewer of search query results to buy an ad that would be seen by other users who performed the same search query, received a targeted search result, or based on targeting criteria as determined by the viewer bidding on the ad. Machine learning and regression analysis may be used in selecting advertisements for placement in conjunction with search results, in one embodiment.

FIG. 1 illustrates a high-level block diagram of a process of targeting advertisements to users of a social networking system based on user searches, in one embodiment. An advertiser user interface module 102 may provide generated advertisements 104 that each includes targeting criteria 140 and a commercial message 142 to an ad request module 106. The social networking system 100 may receive advertisements 104 from advertisers through a user interface provided by the advertiser interface module 102, in one embodiment. In another embodiment, the social networking system 100 may receive advertisements 104 from advertisers through an application programming interface (API) provided by the advertiser interface module 102. An ad targeting module 108 may receive the advertisements 104 from the ad request module 106. A real-time search engine 110 may receive search queries from users of the social networking system 100 and provide search results based on the search queries. Search results may include structured results such that the real time search engine 110 may provide information about the search results to the ad targeting module 108 for targeting search results.

FIG. 1 and the other figures use like reference numerals to identify like elements. A letter after a reference numeral, such as "104a," indicates that the text refers specifically to the element having that particular reference numeral. A reference numeral in the text without a following letter, such as "104," refers to any or all of the elements in the figures bearing that reference numeral (e.g. "104" in the text refers to reference numerals "104a" and/or "104b" in the figures). Only three advertisements 104 are shown in FIG. 1 in order to simplify and clarify the description.

A social networking system 100 may enable advertisers to target their advertisements 104 to users of the social networking system based on user searches performed on the social networking system. The ad targeting module 108 may receive advertisements 104 from the ad request module 106 for targeting within the social networking system 100. The ad targeting module 108 includes a search ad selection module 124, an ad placement module 126, a user feedback module 128, and a machine learning module 130. Using these modules, the ad targeting module 108 may communicate with a real time search engine 110 that is used by users of the social networking system 100 to search for content items in the social networking system 100, including but not limited to content posts made by connected users in the social networking system 100, pages, groups, and other entities connected to viewing users in the social networking system 100, as well as pages, groups, users, events, applications, topics, interests, entities and other nodes on the social networking system 100 that may or may not be connected to the viewing user generating the search. The ad targeting module 108 may rely on a search ad selection module 124 to select an ad for placement within typeahead search results and/or executed search results based on terms included in the search query generated by the viewing user, in one embodiment.

The ad targeting module 108 may use an ad placement module 126 to determine a placement of a selected ad among results of an executed search based on the type of ad and the type of search results generated. For example, an advertisement 104 selected by the search ad selection module 124 for placement within search results communicated by the real time search engine 110 may be placed by the ad placement module 126 among the search results in a typeahead user interface as the viewing user is generating search terms based on the content of the advertisement 104, such as the commercial message 142 included in the advertisement 104. A particular advertisement 104 in the typeahead user interface may link to a particular entity or node being increased by the advertisement 104 among other links to other nodes relevant to the search query. For example, a searching user may query for "fantasy baseball," returning various nodes and entities in the social networking system 100, such as a gaming application for fantasy baseball, an interest for fantasy baseball, a group for fantasy baseball, and so on. The particular advertisement 104 for a fantasy baseball application generated by Major League Baseball (MLB) and may boost a link to that application in the rankings of the typeahead search results, in one embodiment. A link may be "boosted" as a result of an advertiser, here MLB, paying a fee to the social networking system 100 to have the link, or any content item in the social networking system, placed higher in the rankings of the typeahead search results or having the rank of the link be increased by an amount commensurate to the fee. In another embodiment, the particular advertisement 104 for the MLB fantasy baseball application may be inserted into the typeahead search results based on the received query. The inserted advertisement 104 may have a customized message to the viewing user regarding fantasy baseball and MLB, and the inserted advertisement 104 may appear larger than the other typeahead search results, in one embodiment.

The real time search engine 110 includes a search interface module 112, a structured query module 114, a typeahead results module 116, an item ranking module 118, a structured results module 120, and a search ad display module 122. The search interface module 112 provides a user interface for searching users to input search queries received by the social networking system 100. In one embodiment, the search interface module 112 may enable users of the social networking system 100 to generate search queries on external websites outside of the social networking system 100 where the search queries are processed by the social networking system 100. A social plugin, connect, iFrame, desktop application, native mobile application, web browser application, and/or tool navigation bar may be provided by a search interface module 112 to enable users to generate search queries on external websites outside of the social networking system 100 as well as on the social networking system 100. A structured query module 114 receives search queries inputted by searching users and identifies structured elements in the social networking system 100, such as applications, interests, topics, entities, users, groups, events, and content items. A structured element may be defined as a node in a social graph maintained by the social networking system 100, where the node is stored as an object in the social networking system 100. Applications, interests, topics, entities, users, groups, events, and content items are nodes in the social graph represented by objects stored in the social networking system 100. In this way, the real time search engine may recognize whether the searching user is searching for a person, an entity, a group, an application, a concept, an event, or a content item.

A typeahead results module 116 retrieves and provides for display a plurality of typeahead search results as the searching user inputs characters in a string of text, where the social networking system 100 identifies search terms from the characters in the string of text as a search query in the social networking system 100. An item ranking module 118 generates a ranking of search results to be provided to a user. The rankings of search results may be adjusted based on the advertisement 104 boosting a particular search result, in one embodiment. Ranking results in a typeahead search box based on prefix terms in a search query is further discussed in "Search and Retrieval of Objects in a Social Networking System," U.S. Pat. No. 8,239,364, filed on Jun. 15, 2010, hereby incorporated by reference. A structured results module 120 identifies structured information about search results generated from a search query, such as whether the results are entities, users, applications, groups, content items, events, and so forth. A search ad display module 122 provides advertisements 104 that are targeted to search results to a viewing user as received from the ad targeting module 108. The search ad display module 122 may receive ad placement information from the ad targeting module 108, such as whether the ad should be placed as a banner advertisement, a sponsored story advertisement, an advertisement within the search results, an advertisement in a newsfeed, a push notification on a mobile device, an alert, a communication received on an external system outside of the social networking system 100 provided by the search ad display module 122, or any other communication channel used by the social networking system 100 to send messages, such as advertisements, to its users.

In one embodiment, the typeahead results module 116 receives a request from an advertiser to boost, or otherwise increase, a ranking of a target object in the typeahead search results. The boost in the ranking of the target object may not be visible to the searching user as the user types a search query. A typeahead search results module 116 uses a prefix match of the search query to a plurality of objects in the social networking system 100 to generate a plurality of typeahead search results comprising the plurality of objects.

A search results ad buy user interface module 132 may receive search queries and search results from the real time search engine 110. The search results ad buy user interface module 132 may provide a viewing user a user interface element for placing a bid on search results. The search results ad buy user interface 132 may communicate bids to a search query targeting criteria bidding module 134. The search query targeting criteria bidding module 134 may provide a bid auction exchange for advertisers to bid on specific search queries, partial search queries, and the like. The search query targeting criteria bidding module 134 may store targeting clusters based on search queries, in one embodiment. A targeting cluster may be defined as a group of users that are targeted by an advertisement based on a criteria defined by an ad request. A targeting cluster based on search queries may be defined as a group of users performing the same or similar search query being grouped as a targeting cluster. In another embodiment, a targeting cluster may change based on the viewing user performing the search query that was bid on by an advertiser such that the advertisement may be displayed to different users of the social networking system 100 based on the search query that is performed.

In a further embodiment, targeting criteria may be defined for an ad request based on a particular entity or node being included in a group of search results. The social networking system 100 may enable a searching user to bid on an ad using one or more of the search results as targeting criteria. For example, an advertiser may target an advertisement embedded in search results that include a search result for a particular entity, node, genre, or any other structured node information. The search results ad buy user interface module 132 may enable the advertiser to bid on search results that include a result for the particular entity, node, genre, or any other structured node information. Targeting criteria may also be defined for an ad request based on a particular entity or node being used in the search query. For example, a user interface element may be provided in a typeahead search results user interface after a string of characters are inputted into the search interface, such as "karaok" which may be matched to the term "karaoke." The search results ad buy user interface module 132 may provide a user interface element within the typeahead search results to enable an advertiser to bid on typeahead search queries and/or results based on strings of characters matching a particular keyword, such as "karaoke."

System Architecture

Figure 2:
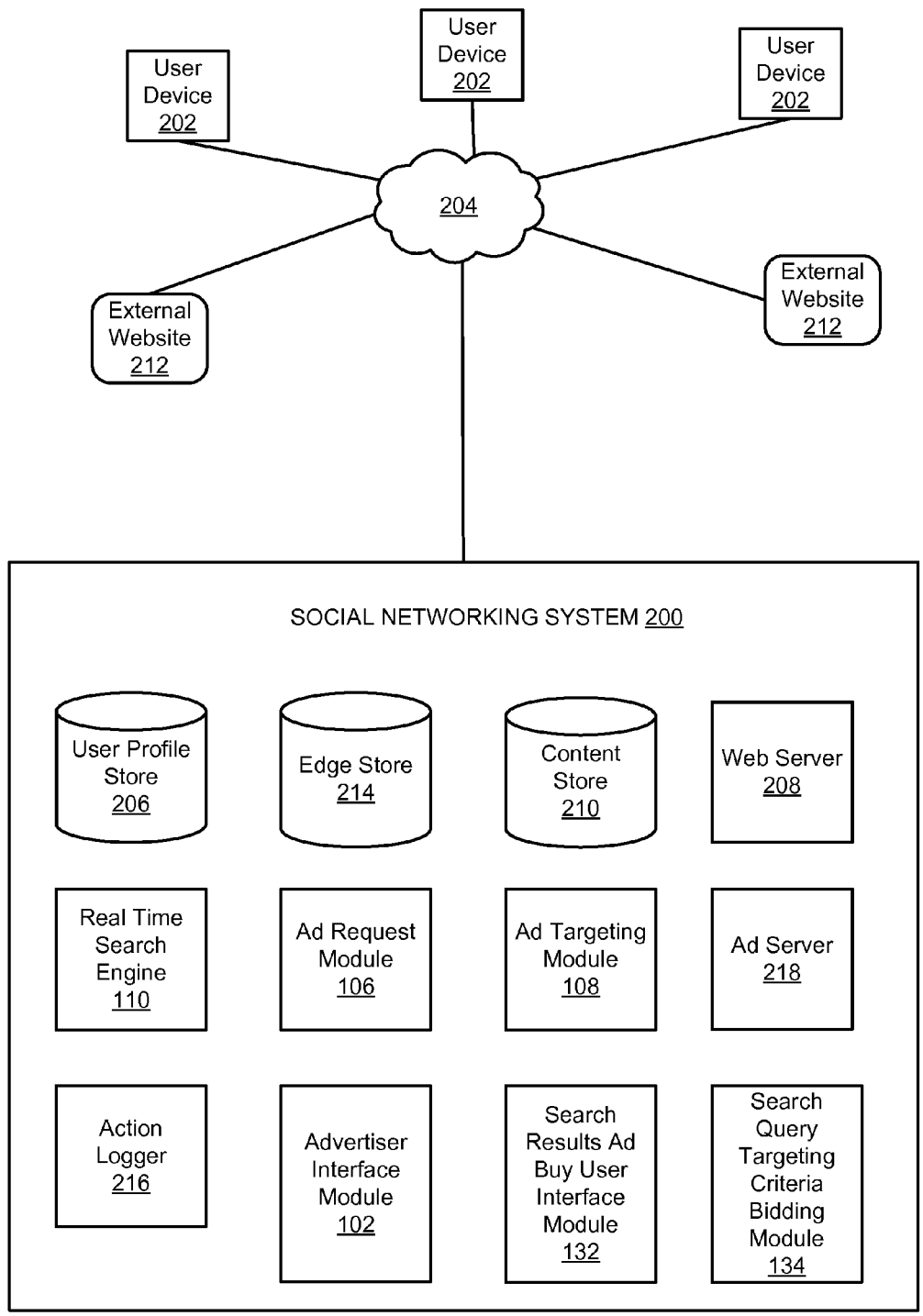
FIG. 2 is a high-level block diagram of a system for targeting advertisements to users of a social networking system based on user searches, showing a block diagram of the social networking system, according to one embodiment.

FIG. 2 is a high level block diagram illustrating a system environment suitable for enabling preference portability for users of a social networking system, in accordance with an embodiment of the invention. The system environment comprises one or more user devices 202, the social networking system 100, a network 204, and external websites 212. In alternative configurations, different and/or additional modules can be included in the system.

The user devices 202 comprise one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, etc. The user device 202 is configured to communicate via network 204. The user device 202 can execute an application, for example, a browser application that allows a user of the user device 202 to interact with the social networking system 100. In another embodiment, the user device 202 interacts with the social networking system 100 through an application programming interface (API) that runs on the native operating system of the user device 202, such as iOS and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes an ad targeting module 108, an edge API module 110, an ad server 112, a user profile store 206, a web server 208, a content store 210, an edge store 214, an action logger 216, and an ad server 218. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202; the web server 208 serves web pages, as well as other web-related content, such as Java, Flash, XML, and so forth. The web server 208 may provide the functionality of receiving and routing messages between the social networking system 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 210. Additionally, the web server 208 may provide API functionality to send data directly to native user device operating systems, such as iOS, ANDROID, webOS, and RIM.

An ad server 218 serves advertisements, embodied in ad objects 118 stored in the ad store 210, to users of the social networking system 100 on the social networking system 100. In one embodiment, the ad server 112 may serve advertisements to external websites 102 based on targeting criteria received via the ad targeting module 108. In another embodiment, the ad server 112 serves advertisements that include content items posted by users of the social networking system 100 that are sponsored by an advertiser. For example, a user may create a check-in event at a Starbucks Coffee shop in San Francisco, Calif. that is shared with other users connected to the user. An advertiser for Starbucks may highlight that check-in event in the other users' feeds by creating an advertisement based on the check-in event that is targeted to the other users connected to the user.

The action logger 216 is capable of receiving communications from the web server 208 about user actions on and/or off the social networking system 100. The action logger 216 populates an action log with information about user actions to record them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well.

An action log may be used by a social networking system 100 to log users' actions on the social networking system 100 as well as external websites that communicate information back to the social networking system 100, in accordance with users' privacy settings and terms of service agreements where the social networking system 100 hashes and/or anonymizes user-identifying information. As mentioned above, users may interact with various objects on the social networking system 100, including commenting on posts, sharing links, and checking-in to physical locations via a mobile device. The action log may also include user actions on external websites. For example, an e-commerce website that primarily sells luxury shoes at bargain prices may recognize a user of a social networking system 100 through social plug-ins that enable the e-commerce website to identify the user of the social networking system. Because users of the social networking system 100 are uniquely identifiable, e-commerce websites, such as this luxury shoe reseller, may use the information about these users as they visit their websites. The action log records data about these users, including viewing histories, advertisements that were clicked on, purchasing activity, and other patterns from shopping and buying.

User account information and other related information for a user are stored in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. The user profile store 206 also maintains references to the actions stored in an action log and performed on objects in the content store 210.

The edge store 214 stores the information describing connections between users and other objects on the social networking system 100. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge store 214 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user. Multiple interactions between a user and a specific object may be stored in one edge object in the edge store 214, in one embodiment. For example, a user that plays multiple songs from Lady Gaga's album, "Born This Way," may have multiple edge objects for the songs, but only one edge object for Lady Gaga.

An ad targeting module 108 may receive targeting criteria for advertisements 104 from an advertiser interface module 102. The ad targeting module 108 may place advertisements within search results in a typeahead user interface, within search results on a page displaying an executed search, as a banner advertisement on the search results page, a sponsored story advertisement, an advertisement in a newsfeed, a push notification on a mobile device, an alert, a communication received on an external system outside of the social networking system 100 provided by the search ad display module 122, and/or any other communication channel used by the social networking system 100 to send messages, such as advertisements, to its users. A search may be performed on the social networking system 100 through a search user interface or on an external website outside of the social networking system 100. A social plugin, connect, iFrame, desktop application, native mobile application, web browser application, and/or tool navigation bar may be provided by the ad targeting module 108 to enable users to generate search queries on external websites outside of the social networking system 100 as well as on the social networking system 100. For example, an advertisement for a local offer on photography classes may be targeted to users that have recently searched for the term "photography" in the social networking system 100. In another embodiment, an advertisement for a local offer on photography classes may be targeted to users that search for anything that leads the users to a search result for a local photography studio. The ad targeting module 108 may receive an advertisement 104 having targeting criteria 140 generated by a search results ad buy user interface module 132 that includes instructions for the ad targeting module 108 to target the advertisement 104 based on a particular search result. By enabling advertisers to target advertisements to users based on search results, advertisers may provide more relevant and timely advertisements to users. In one embodiment, the ad targeting module 108 may target new users performing the targeted search queries and delivers the targeted advertisements for display.

In one embodiment, advertisers may include multiple targeting criteria based on searches performed by users of the social networking system 100. For example, an advertiser may target users that performed a search for "restaurants near Palo Alto" in the social networking system 100 and performed a later search for "Fuki Sushi," a restaurant in Palo Alto. The social networking system 100 may also rely on user profile information, such as information that the searching user has previously checked-in at Fuki Sushi, in targeting an advertisement for a competitor of Fuki Sushi to the searching user. In this way, multiple searches may be used for targeting advertisements, and conditional targeting, both positive and negative, may also be used in targeting criteria.

Figure 3:
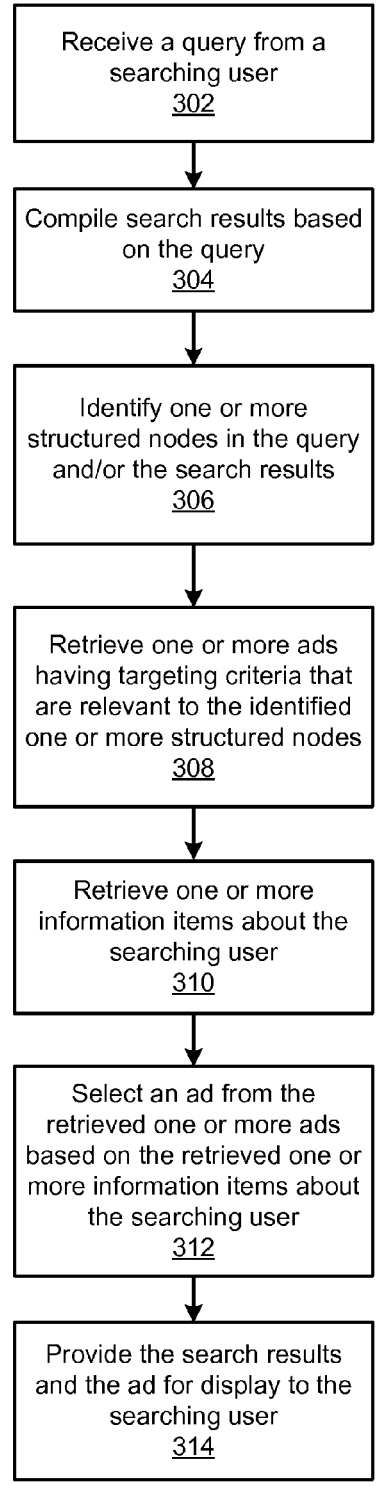
FIG. 3 is a flow chart describing the process of targeting advertisements to users of a social networking system based on user searches according to one embodiment.

Targeting Ads Based on Search Queries and Search Results Determined by a Social Networking System FIG. 3 illustrates a flow chart diagram depicting a process of targeting advertisements to users of a social networking system based on user searches, in accordance with an embodiment of the invention. A query from a searching user is received 302. The query may be received 302 from a user interface on a user device connected to the social networking system 100, in one embodiment. In another embodiment, the query may be received 302 from a user interface on an external system outside of the social networking system 100, such as an external website. A social plugin, connect, iFrame, desktop application, native mobile application, web browser application, and/or tool navigation bar may be provided to receive 302 a query from a user interface on external websites outside of the social networking system 100 as well as on the social networking system 100. In a further embodiment, the query may be received 302 through a different type of interface, such as an application programming interface (API).

Search results based on the query are then compiled 304. The search results may be compiled 304 using a real time search engine on the social networking system 100. The real time search engine may search for the terms included in the query among the content items, entities, users, events, groups, applications, and other information items in the social networking system 100. In one embodiment, the search results based on the query may be compiled 304 using other search terms relevant to the search query received 302 from the searching user. In another embodiment, the search query may be interpreted by the social networking system 100 to compile 304 the search results, such as a query for "restaurants near San Francisco." In that instance, the searching user is probably looking for restaurants to dine at near San Francisco, not necessarily looking for content item posts by connected users that include the words "restaurants near San Francisco," but instead looking for objects in the social networking system 100 that are "restaurants" that are located "near San Francisco," meaning located within a predetermined proximity to San Francisco, Calif. As a result, the social networking system 100 may interpret the search query to execute a different search query, such as objects that are "restaurants" and that have location properties near San Francisco, Calif., USA.

One or more structured nodes in the query and/or the search results are identified 306. Structured nodes in the social networking system 100 include users, entities, applications, events, groups, content items, and graph objects. The social networking system 100 may identify 306 structured nodes in the query and/or the search results based on one or more object properties of the search results and/or term in the search query, in one embodiment. In another embodiment, the social networking system 100 may identify 306 structured nodes in the query by retrieving one or more objects relevant to search terms included in the query and determining one or more structured nodes in the social networking system 100 based on the retrieved one or more objects.

One or more ads having targeting criteria that are relevant to the identified one or more structured nodes are then retrieved 308. The targeting criteria of the one or more ads may specifically identify one of the one or more structured nodes identified in the query and/or search results to be retrieved 308 by the social networking system 100, in one embodiment. In one embodiment, targeting criteria of the one or more ads may include one or more keywords that are relevant to the identified one or more structured nodes such that the one or more ads may be retrieved 308. One or more information items about the searching user may then be retrieved 310. Such information items may include user profile information, interests, user behavior on the social networking system 100 such as clicking on links and content posted by users, entities, and applications on the social networking system 100, and information about connected users and entities in the social networking system 100. Other information items about the search may also be retrieved 310, such as explicitly stated user interests and connections to a node, object, entity, brand, or page the user is connected to via the social graph or open graph, implicit or inferred user interests and connections based on a user's past history, demographic, social activity, friends' activity, subscriptions, and analyzing other people similar to the user. The information items may include interests, events, and the like.

An ad is selected 312 from the retrieved one or more ads based on the retrieved one or more information items about the searching user. For example, where an advertisement is selected based in part on the user's connections in the social networking system, an advertisement for a sushi restaurant that has been checked into multiple times by connections of the viewing user may be selected for display to the viewing user where the search query comprised "sushi restaurants" as opposed to other ads for sushi restaurants that are not connected to a viewing user. In another embodiment, an ad is selected 312 from the retrieved one or more ads based on information about the searching user that indicates a likelihood that is greater than a predetermined threshold that the searching user would click on the selected ad, such as an expected clickthrough rate of the selected ad. In another embodiment, the ad may be selected 312 based on information about the viewing user that maximizes the expected cost per click or expected cost per impression of the ad.

After the ad is selected 312, the search results and the ad are provided 314 for display to the searching user. In one embodiment, the search results and the ad are provided 314 in a typeahead search interface as the searching user inputs one or more terms of the search query. In another embodiment, the search results and the ad are provided 314 in a typeahead search interface in a particular order based on determined rankings of the search results and the selected ad. In a further embodiment, the search results and the ad are provided 314 for display to the searching user such that the selected ad is merged with one or more of the search results in the typeahead search results. For example, if one or more search results included links to Pepsi Cola, Pepsi USA, and Diet Pepsi, and a selected ad for the viewing user was about Pepsi, the three search results and the selected ad may be merged into a larger advertisement that includes a commercial message targeted to the viewing user.

In yet another embodiment, the search results and the selected ad may be provided 314 for display to the searching user as a page in the social networking system 100, such as a page of search results after the search query is executed or a user interface on a mobile device displaying the search results after the search is executed. In one embodiment, the search results and the selected ad may appear as a listing of selectable links that may induce the searching user to browse various nodes on the social networking system 100. In another embodiment, the selected ad may appear in a dedicated section of the page while the search results are listed separately.

Figure 4:
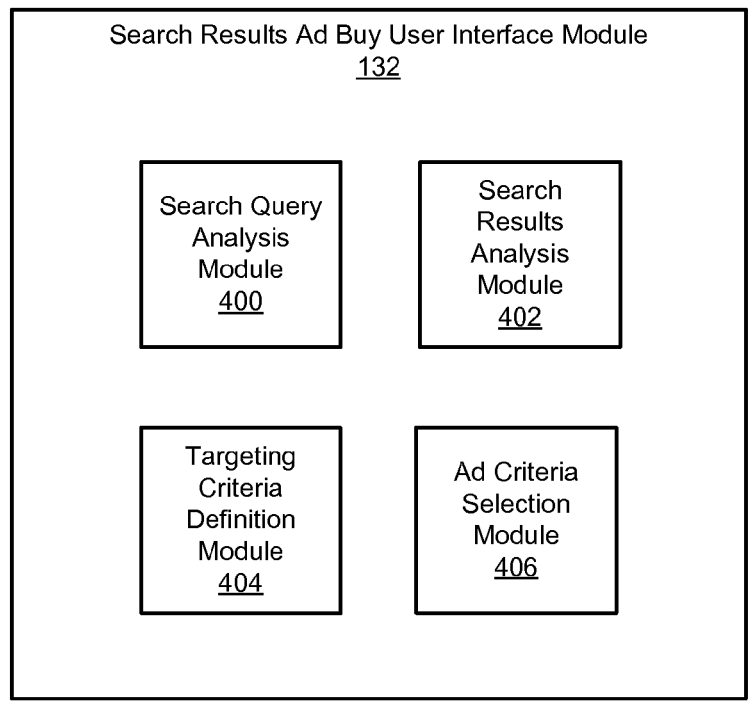
FIG. 4 is a high level block diagram illustrating a search results ad buy user interface module that includes various modules for enabling advertisers to bid on searches in a social networking system, in accordance with an embodiment of the invention.

FIG. 4 illustrates a high level block diagram of the search results ad buy user interface module 132 in further detail, in one embodiment. The search results ad buy user interface module 132 includes a search query analysis module 400, a search results analysis module 402, a targeting criteria definition module 404, and an ad criteria selection module 406. These modules may perform in conjunction with each other or independently to provide a search results ad buy user interface to searching users to bid on search results as targeting criteria.

A search query analysis module 400 may be used to determine an analysis of received search queries for defining targeting criteria for ad requests that include particular search queries in the social networking system 100. For example, a search query for "tacos" may be analyzed by the search query analysis module 400 such that the term "taco" is recognized as an object in the social networking system 100. The object for "taco" may have one or more object properties, such as being a food item, being served at restaurants, being served at Mexican restaurants, being served at Taco Bell, and so on. The word "taco" may also be found in various content items, such as posts by users of the social networking system 100 claiming free tacos at Taco Bell locations as a promotion after San Francisco Giant Angel Pagan stole a base in Game 3 of the 2012 World Series of Major League Baseball. The search query analysis module 400 may identify the term "taco" being searched with the term "free" and define a separate targeting criteria for those users performing that search query, in one embodiment. In another embodiment, the search query analysis module 400 may analyze and track search queries being performed in the social networking system 100 to determine which phrases are being searched for more frequently. Continuing the example, an advertiser for a competitor of Taco Bell, such as Del Taco, may be interested in placing advertisements for popular searches involving tacos, such as "free taco." As a result, the search query analysis module 400 may recommend the popular search query to the advertiser for Del Taco for bidding on targeting criteria that uses the search query based on the analysis. Popular search queries, as determined by the search query analysis module 400, may be presented to advertisers through an advertiser interface module 102, for example.

A search results analysis module 402 may analyze search results received from a real time search engine 110 in the social networking system 100 to determine whether a particular node or entity is included in the search results to target advertisements based on the search results. In one embodiment, the search results analysis module 402 may record search queries that, when performed by a viewing user, returns search results that include a particular entity or node being targeted. The stored search queries may then be bid on by advertisers in an auction application or through an ad buy user interface. In another embodiment, the search results analysis module 402 identifies whether search results include a particular entity, node, or type of node for targeting by advertisers that have bid on the particular entity, node, or type of node. For example, if an advertiser for Pepsi bids on an advertisement to be placed whenever a soda product appears as a search result, the search results analysis module 402 may determine whether search results include a soda product, thus satisfying the targeting criteria for the Pepsi advertisement. In a further embodiment, targeting criteria may be defined based in part on information retrieved from search queries and search results. The targeting criteria may then later be used to target advertisements to the searching user on the social networking system 100 as well as on external websites outside of the social networking system 100.

A targeting criteria definition module 404 generates targeting criteria based on search results for targeting advertisements. In one embodiment, the targeting criteria of a search results advertisement is determined by the social networking system 100 upon an advertiser placing a bid on a particular search results page. The targeting criteria definition module 404 then defines targeting criteria to target search results that include a particular entity, node, or type of node, or a search query that is currently being performed or has been executed, in one embodiment. In another embodiment, the targeting criteria definition module 404 may define particular targeting criteria to include a particular search query based on one or more users performing the targeted search query. For example, the targeting criteria definition module 404 may interpret a received search query, such as "restaurants near Oakland" to form a particular search query in the social networking system 100, such as selecting all restaurant-type objects that are located within five (5) miles of Oakland, Calif., USA. Once the targeted search query defined by the targeting criteria reaches a predetermined threshold amount of executed queries, the social networking system 100 may recommend the targeted search query to advertisers based on relevance, in one embodiment.

An ad criteria selection module 406 provides one or more selectable links for selecting targeting criteria for ads in an ad buy user interface provided by the search results ad buy user interface module 132. The ad criteria selection module 406 may receive information about the query that was performed to produce the search results that accompanied the placement of the search ad buy user interface. That information may include one or more of the particular search terms included in the search query. In another embodiment, the specific search query may be included as a selectable link in the user interface for selecting targeting criteria for an advertisement.

Figure 5A:
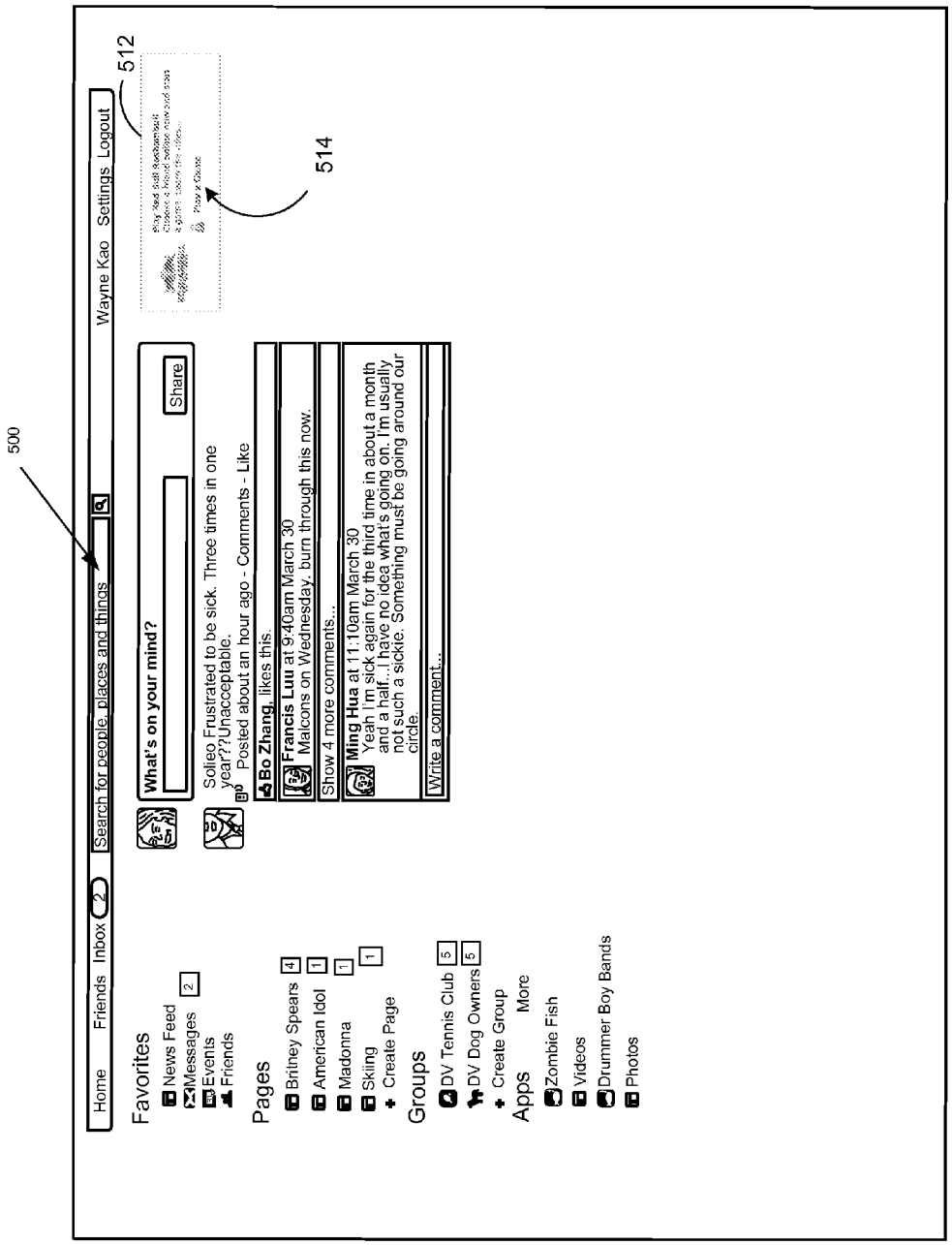
FIGS. 5A-D depict example screenshots of a process of targeting advertisements in relation with a real-time search engine on a social networking system according to one embodiment.

FIGS. 5A-D illustrate example screenshots of a process of targeting advertisements in relation with a real-time search engine on a social networking system according to one embodiment of the invention. FIG. 5A illustrates an example screenshot of a landing page for social networking system 100 being browsed by a viewing user on a web browser operating on a user device 202. In other embodiments, the viewing user may access the social networking system 100 on a mobile device operating an application that provides a user interface for accessing the social networking system 100. A search engine user interface 500 is displayed on the landing page as illustrated in FIG. 5A. Also illustrated on the landing page is a banner advertisement 512 that includes a call to action 514. This advertisement 512 for a Red Bull game invites the user to play the game by providing a direct link to the game via the call to action 514.

Figure 5B:
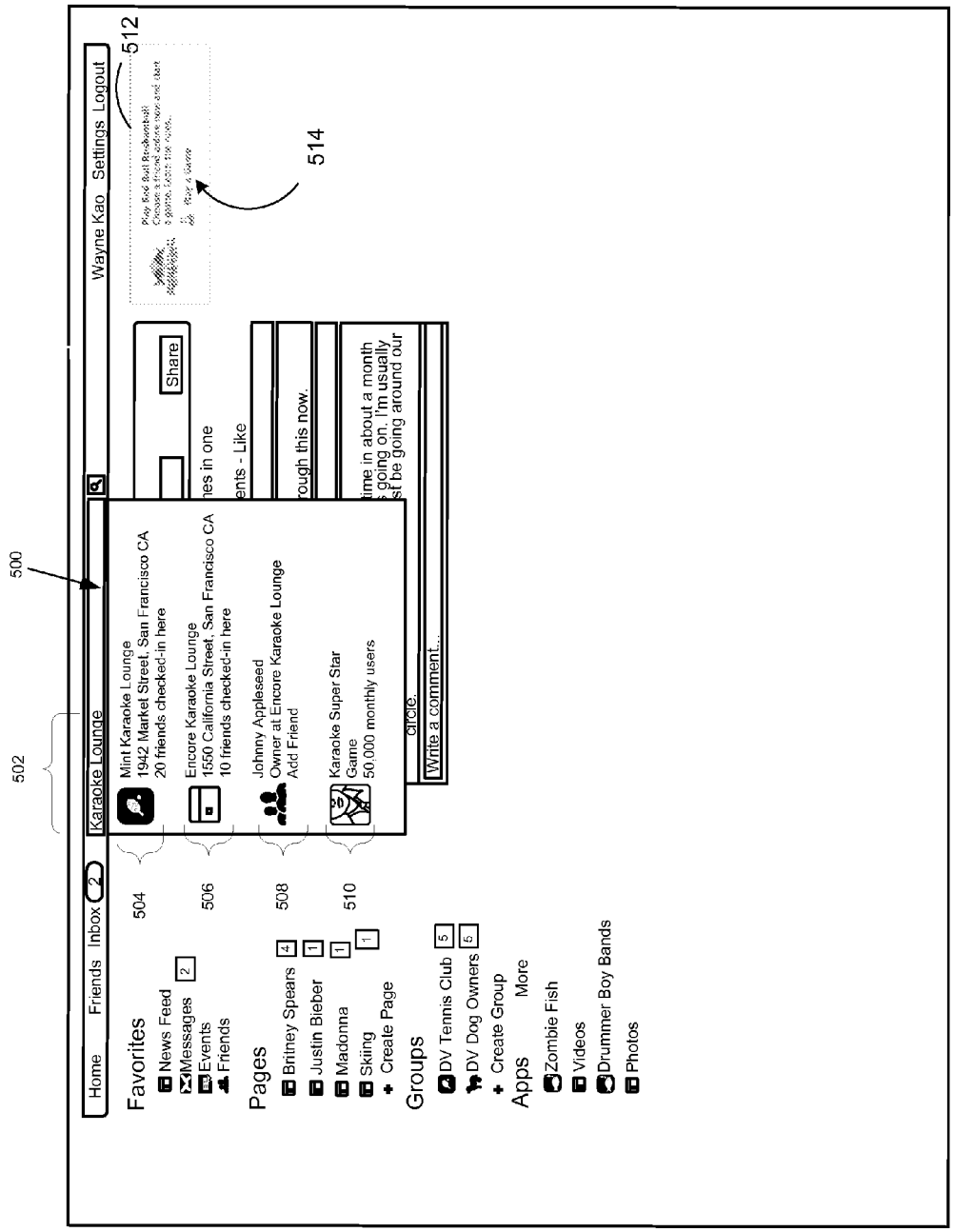

FIG. 5B depicts an example screenshot of the same landing page as illustrated in FIG. 5A after search terms 502 have been entered in the search engine user interface 500. As the search terms 502 are inputted into the search engine user interface 500, a drop down menu of links may be displayed to provide typeahead search results. Typeahead search results may include search results as determined by a real time search engine 110, in one embodiment. In another embodiment, typeahead search results may be determined by a separate search engine, such as an external system for searching content on external websites in addition to content on the social networking system 100. As illustrated in FIG. 5B, a search result 504 for Mint Karaoke Lounge, a search result 506 for Encore Karaoke Lounge, a search result 508 for Johnny Appleseed, and a search result 510 for Karaoke Super Star is included in the list of typeahead search results as provided by the search engine user interface 500 after the search terms 502 "Karaoke Lounge" are inputted.

In one embodiment, the typeahead search results are initially ranked according to relevance to the searching user. Factors determining relevance to a searching user for typeahead search results are further discussed in "Search and Retrieval of Objects in a Social Networking System, U.S. Pat. No. 8,239,364, filed on Jun. 15, 2010, hereby incorporated by reference. Prefix search results may be compiled by the social networking system 100 that are relevant to the searching user where the prefix search results match the received search query. In this example, "Karaoke Lounge" is inputted as a search query, and "Mint Karaoke Lounge" and "Encore Karaoke Lounge" have been retrieved as matches. The social networking system may receive a request from an advertiser to boost, or otherwise increase, a ranking of a target object in the typeahead search results, such as the object for Mint Karaoke Lounge. As illustrated in FIG. 5B, the boost in the ranking of the target object may not be visible to the searching user as the user types a search query.

The search results 504 and 506 for Mint Karaoke Lounge and Encore Karaoke Lounge may appear as the top two typeahead search results because the search terms 502 are in the title of the nodes, in one embodiment. In another embodiment, the search result 504 for Mint Karaoke Lounge may be ranked higher than the search result 506 for Encore Karaoke Lounge because more friends of the viewing user had checked-in at Mint Karaoke Lounge. In a further embodiment, the social networking system 100 may have received a request from an advertiser to boost a ranking for Mint Karaoke Lounge in the typeahead search results displayed in the drop down menu, or the typeahead search results user interface. The search result 508 for Johnny Appleseed, the owner of Encore Karaoke Lounge, may appear in the typeahead search results because the viewing user may have recently checked-in to Encore Karaoke Lounge, may be connected indirectly to Johnny Appleseed, such as being tagged in a picture with the owner on the social networking system 100, and so forth.

The search result 510 for Karaoke Super Star, a game with 50,000 monthly users in the social networking system 100, may be included in the typeahead search results after being boosted by an advertisement for the game, in one embodiment. The title of the game does not include both search terms 502, "Karaoke Lounge," but does include the term "karaoke." The advertisement that boosted the ranking of the search result 510 for Karaoke Super Star may have targeted any search queries that include the term "karaoke." In another embodiment, the advertisement may include the search result 510 for Karaoke Super Star such that the advertisement is inserted into the typeahead search results provided in the search engine user interface 100.

Figure 5C:
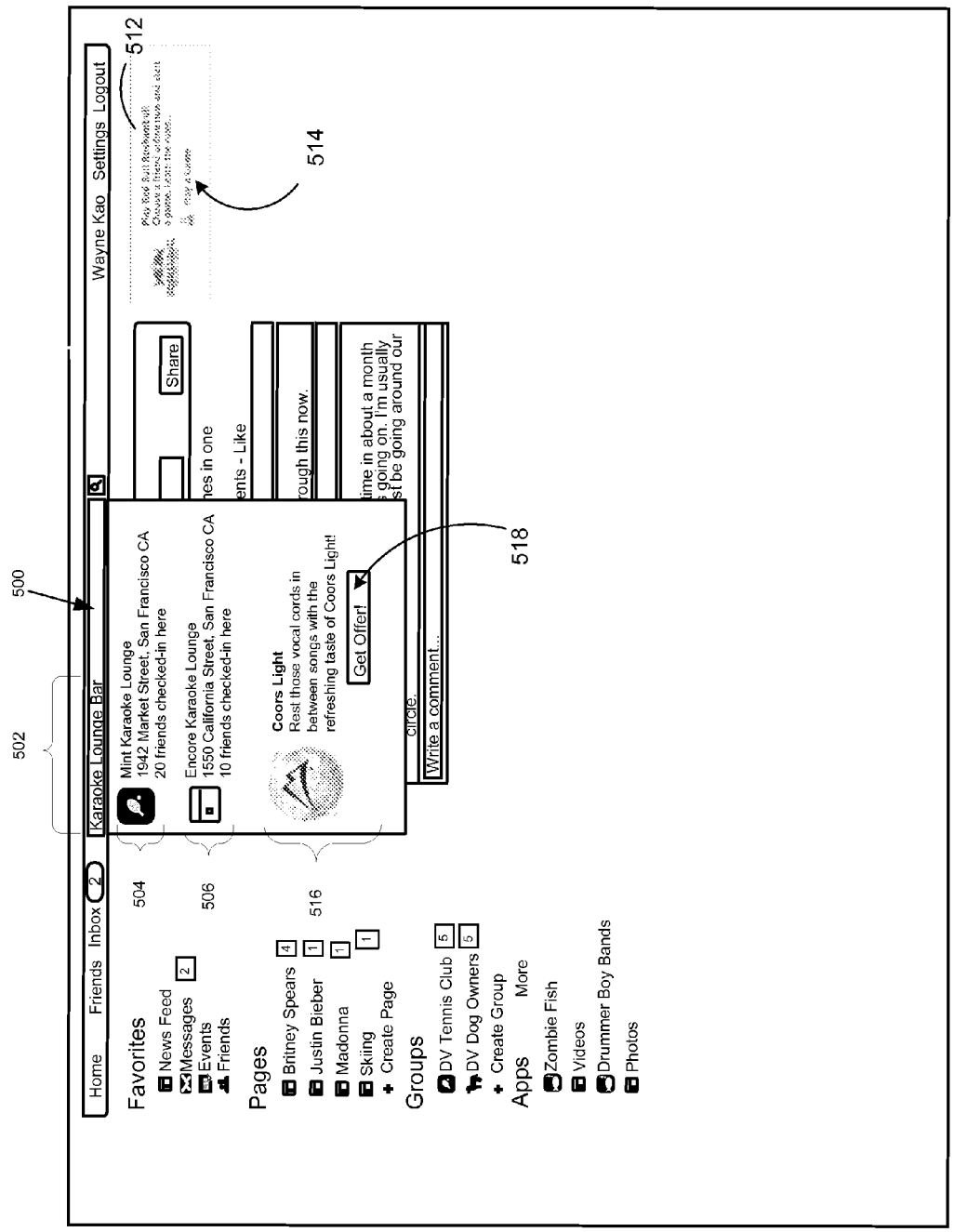

FIG. 5C illustrates an example screenshot of the landing page where an additional term is inputted into the search engine user interface 500. Here, the search terms 502 now include "Karaoke Lounge Bar." As a result, the typeahead search results provided for display in the search engine user interface 500 includes the search result 504 for Mint Karaoke Lounge, the search result 506 for Encore Karaoke Lounge, and an advertisement 516 for Coors Light. The advertisement 516 for Coors Light may be inserted into the typeahead search results based on the addition of the search term "bar" in the search engine user interface 500. The advertisement 516 may include a call to action link 518 that enables the viewing user to claim an offer from Coors Light. Clicking on the link 518 may send the searching user to the page for Coors Light in the social networking system 100, in an embodiment. In another embodiment, clicking on the link 518 may direct the user to an application in which the social networking system 100 may provide a mechanism for the user to claim the offer. In a further embodiment, clicking on the link 518 may direct the user to an external system or external website. In one embodiment, the commercial message of the advertisement 516 for Coors Light may be specially drafted in response to the search terms 502 that were inputted into the search engine user interface 500. For example, the advertisement 516 may include the commercial message "Rest those vocal cords in between songs with the refreshing taste of Coors Light!" based on the search terms "karaoke" and "bar." The advertisement 516 may have been specifically targeted to users that are searching for karaoke bars.

Figure 5D:
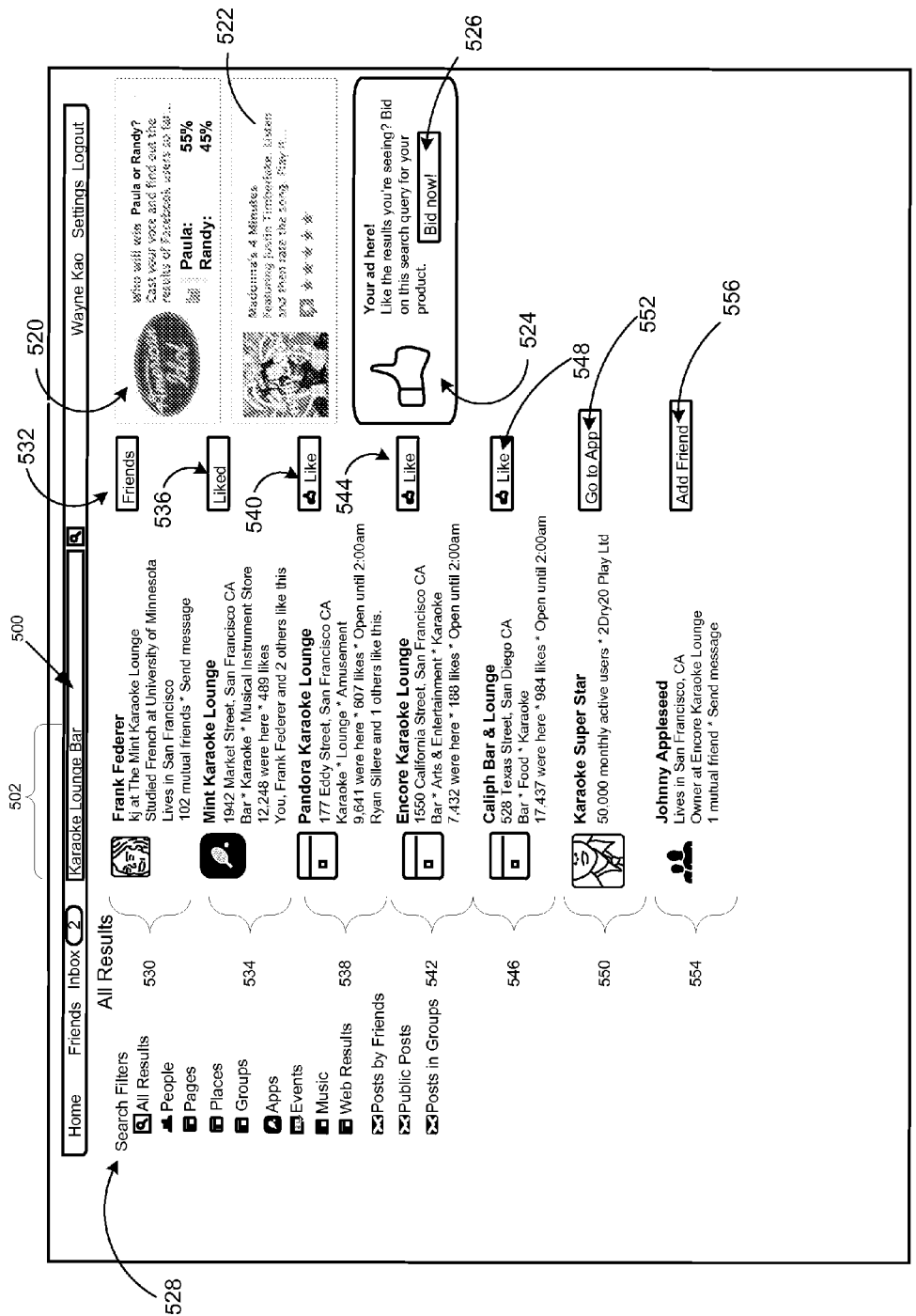

FIG. 5D illustrates an example screenshot of a search results page after the search query has been executed in the social networking system 100. The search results page includes an advertisement 520 for American Idol and an advertisement 522 for Madonna's 4 Minutes. The advertisements 520 and 522 may be targeted to the search results based on the search terms "Karaoke Lounge Bar," indicating that the viewing user may be interested in music, in singing karaoke, and, accordingly, interested in American Idol and Madonna. The social networking system 100 may determine, based on the search terms 502, that the advertisement 520 for American Idol and the advertisement 522 for Madonna should be provided for display to the viewing user, in an embodiment. In one embodiment, an advertisement 520 for American Idol may have targeting criteria for search results that include places with a keyword of "karaoke." In another embodiment, the advertisement 520 for American Idol may include targeting criteria based on the search query including the term "karaoke." In a further embodiment, the advertisement 522 for Madonna's 4 Minutes may be targeted to the searching user based on the advertiser targeting users that have an interest in pop music and that may have an intent related to music based on an executed search query related to music. The social networking system 100 may interpret the term "karaoke" as related to music, and the viewing user may have one or more interests in pages and/or entities related to the pop music genre in the social networking system 100. As a result, the advertisement 522 for Madonna's 4 Minutes may be provided for display to the searching user.

FIG. 5D further illustrates a filter user interface 528 such that different types of search results may be viewed by the searching user, such as an all results filter, a people filter, a pages filter, a places filter, a groups filter, an apps filter, an events filter, a music filter, a web results filter, a posts by friends filter, a public posts filter, and a posts in groups filter. The filter user interface 528 includes selectable links for the different types of filters. The social networking system 100 may analyze the search results based on the different types of results that are provided. The filters included in the filter user interface 528 represent the various types of objects that are structured in the social networking system 100. Other types of structured data may also be recognized by the social networking system 100. As a result, advertisers may be provided with additional information about search results through an application programming interface (API), for example.

The executed search may return search results having different object properties, including users, pages, applications, and entities of the social networking system 100. As illustrated in FIG. 5D, the first search result 530 is for Frank Federer, a kj at the Mint Karaoke Lounge. Included in the first search result 530 is an indicator 532 that informs the viewing user that he or she is already connected to Frank Federer as a friend in the social networking system 100. Listed below the first search result 530, other search results include a search result 534 for the page representing Mint Karaoke Lounge that includes an indicator 536 that the page is already connected to the viewing user, a search result 538 for the page representing Pandora Karaoke Lounge and a link 540 for the viewing user to connect with that page, a search result 542 for the page representing Encore Karaoke Lounge and a link 544 for the viewing user to connect with that page, and a search result 546 for the page representing Caliph Bar & Lounge and a link 548 for the viewing user to connect with that page. FIG. 5D also illustrates a search result 550 for a game application titled "Karaoke Super Star" and a link 552 that directs the user to the application in the social networking system 100. The search result 550 may be boosted in the search rankings by an advertiser for the game application, in one embodiment. FIG. 5D also illustrates a search result 554 for a user of the social networking system 100 named "Johnny Appleseed" and a link 556 for the searching user to request to be connected to the user in the social networking system 100.

Based on the search results presented for display on the search results page, an advertiser may decide to bid on targeting criteria based on the search query and/or one or more of the search results. FIG. 5D illustrates a search ad buy user interface 524 that further includes a link 526 to bid on the search results being presented. The search ad buy user interface 524 may be similar in appearance to the advertisements 520 and 522, in one embodiment. The search ad buy user interface 524 may include one or more links 526 to bid on the search results presented on the search results page as illustrated in FIG. 5D. Upon clicking on a link 526 to bid on using the search results as targeting criteria for one or more advertisements, the viewing user may be directed to an application for bidding on one or more search queries that may have been performed to produce the search results. In another embodiment, the user may be directed to an application for bidding on one or more nodes, entities, applications, users, groups, events, and other content items in the social networking system 100 included in the search results page as a result of the search query. The advertiser may bid on the queries or nodes using a bid auction exchange against other advertisers in the social networking system 100, in one embodiment. In another embodiment, the bid auction exchange may be open to advertisers to external systems that may generate advertisements on the external systems. In one embodiment, the social networking system 100 may serve advertisements that direct the user to the external systems, such as an external website, a separate application operating on a mobile device, or an enterprise system.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
receiving a search query in a social networking system from a user device;
determining a plurality of search results based on the search query;
generating, by a processor, a user interface element for bidding on a targeting criteria based on the plurality of search results and the user device, the user interface element comprising one or more selectable links to a bidding auction application for the received search query; and
providing the user interface element and the plurality of search results for display on the user device responsive to the received search query.

2. The method of 1, wherein receiving, by the social networking system, a search query further comprises:
receiving the search query through a user interface in the social networking system.

3. The method of 1, wherein receiving, by a social networking system, a search query further comprises:
receiving the search query through an application programming interface (API) communicatively coupled with the social networking system.

4. The method of 1, further comprising:
determining the targeting criteria to include a plurality of users subsequently performing the search query in the social networking system.

5. The method of 1, wherein generating a user interface element for bidding on a targeting criteria based on the plurality of search results comprises:
determining a type of user interface used to provide the plurality of search results on the user device; and
selecting a format of the user interface element based on the type of user interface used to provide the plurality of search results on the user device.

6. The method of 5, wherein the user device comprises a mobile device, wherein the type of user interface used to provide the plurality of search results on the user device comprises a native application operating on the mobile device, and wherein the format of the user interface element is selected based on the native application.

7. The method of 5, wherein the user device comprises a mobile device, wherein the type of user interface used to provide the plurality of search results on the user device comprises a browser operating on the mobile device, and wherein the format of the user interface element is selected based on the browser.

8. The method of 5, wherein the user device comprises a computer, wherein the type of user interface used to provide the plurality of search results on the user device comprises a browser application operating on the computer, and wherein the format of the user interface element is selected based on a display resolution of the browser application operating on the computer.

9. The method of 5, wherein the user interface element is provided for display on the user device according to the selected format.

10. The method of 1, further comprising:
determining a structured element in the search query, where the structured element corresponds to an object in the social networking system; and
defining the targeting criteria to include a plurality of users associated with the structured element in the social networking system.

11. A method, comprising:
providing a user interface to a user of a social networking system for bidding on a received search query for content in the social networking system, the user interface comprising one or more selectable links to a bidding auction application for the received search query;
receiving selection of a selectable link from the one or more selectable links to the bidding auction application within the user interface;
determining, by a processor, one or more target objects in the social networking system associated with the received search query;
providing the one or more determined target objects associated with the received search query to the bidding auction application in the social networking system; and
providing the bidding auction application for display to the user.

12. The method of 11, wherein providing a user interface to a user of a social networking system comprises:
providing the user interface for display to the user, responsive to the user performing the received search query.

13. The method of 11, wherein providing a user interface to a user of a social networking system comprises:
providing the user interface for display to the user, embedded within a plurality of search results generated by the received query responsive to the user performing the received search query.

14. The method of 11, wherein providing a user interface to a user of a social networking system comprises:
providing the user interface for display to the user, where the user interface is provided for display in a sponsored section of a search results page responsive to the user performing the received search query.

15. The method of 11, wherein providing a user interface to a user of a social networking system comprises:
providing the user interface for display to the user on an external system responsive to the user performing the received search query through the external system.

16. The method of 11, wherein determining one or more targeting objects in the social networking system associated with the received search query comprises:
parsing the received search query into one or more keywords; and
determining one or more targeting keyword objects as the one or more targeting objects based on the parsed one or more keywords.

17. The method of 11, wherein providing the bidding auction application for display to the user further comprises providing within the bidding auction application an asking price based on the received search query, the method further comprising:

determining the asking price based on previously received bids for one or more terms included in the received search query.

18. The method of 11, wherein providing the bidding auction application for display to the user further comprises providing within the bidding auction application an asking price based on the received search query, the method further comprising:
determining a popularity score of the received search query in the social networking system based on a frequency of the social networking system performing the received search query; and
determining the asking price based on the determined popularity score of the received search query.

19. The method of claim 1, further comprising:
receiving selection of a selectable link from the one or more selectable links within the user interface, the selected link to the associated bidding auction application; and
providing the associated bidding auction application for display on the user device.

20. The method of claim 11, wherein the user interface further comprises a user interface element.

21. The method of claim 20, wherein the one or more selectable links to the bidding auction application are displayed within the user interface element.

22. A computer program product comprising a non-transitory computer-readable storage medium containing computer program code for performing the steps:
receiving a search query in a social networking system from a user device;
determining a plurality of search results based on the search query;
generating a user interface element for bidding on a targeting criteria based on the plurality of search results and the user device, the user interface element comprising one or more selectable links to a bidding auction application for the received search query; and
providing the user interface element and the plurality of search results for display on the user device responsive to the received search query.

23. The computer program product of claim 22, further comprising:
receiving selection of a selectable link from the one or more selectable links within the user interface, the selected link to the associated bidding auction application; and
providing the associated bidding auction application for display on the user device.

24. The computer program product of claim 22, further comprising:
determining the targeting criteria to include a plurality of users subsequently performing the search query in the social networking system.

25. The computer program product of 22, further comprising:
determining a structured element in the search query, where the structured element corresponds to an object in the social networking system; and
defining the targeting criteria to include a plurality of users associated with the structured element in the social networking system.

26. A computer program product comprising a non-transitory computer-readable storage medium containing computer program code for performing the steps:
providing a user interface to a user of a social networking system for bidding on a received search query for content in the social networking system, the user interface comprising one or more selectable links to a bidding auction application for the received search query;

receiving selection of a selectable link from the one or more selectable links to the bidding auction application within the user interface;

determining, by a processor, one or more target objects in the social networking system associated with the received search query;

providing the one or more determined target objects associated with the received search query to the bidding auction application in the social networking system; and providing the bidding auction application for display to the user.

* * * * *